E. C. HORNI.
DEMOUNTABLE TIRE RIM.
APPLICATION FILED AUG. 26, 1918.

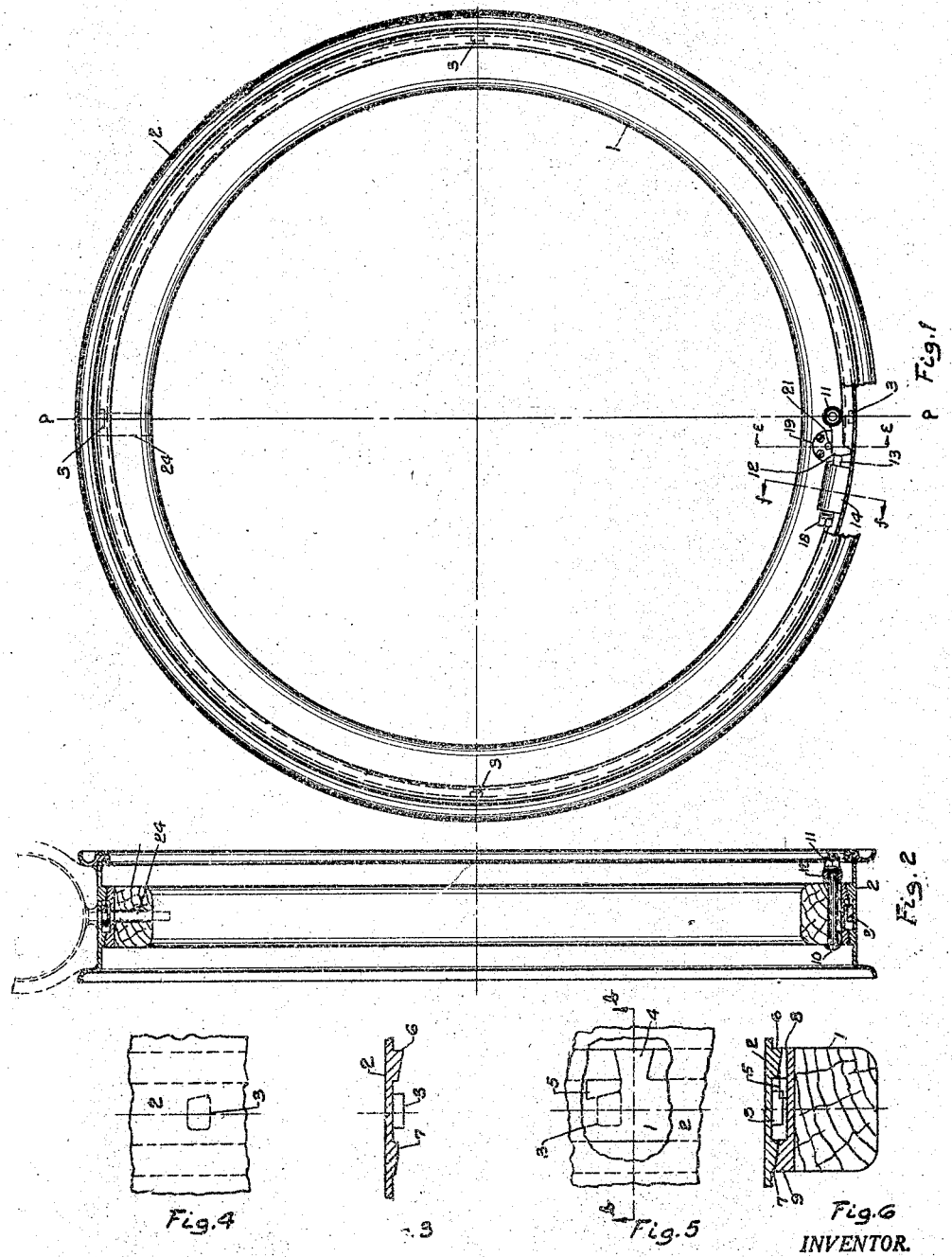

1,299,472.

Patented Apr. 8, 1919.
2 SHEETS—SHEET 2.

INVENTOR.
Edward C. Horni,
BY Howard P. Smith
His ATTORNEYS.

WITNESSES
Ada M. Dunlap
W. B. Hornell

UNITED STATES PATENT OFFICE.

EDWARD C. HORNI, OF DAYTON, OHIO.

DEMOUNTABLE TIRE-RIM.

1,299,472.  Specification of Letters Patent.  Patented Apr. 8, 1919.

Application filed August 26, 1918. Serial No. 251,438.

*To all whom it may concern:*

Be it known that I, EDWARD C. HORNI, a citizen of the United States, residing at Dayton, in the county of Montgomery and State of Ohio, have invented certain new and useful Improvements in Demountable Tire-Rims, of which the following is a specification.

This invention relates to new and useful improvements in demountable tire rims.

The principal object of the invention is to enable one to change tires on an automobile or other vehicle without the present inconvenience of removing numerous nuts.

A further object of the invention is to provide a demountable rim which is readily applied to, and removed from, the felly, and which is firmly held on the latter when in place thereon.

Figure 12:
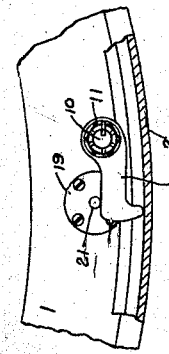
Figure 13:
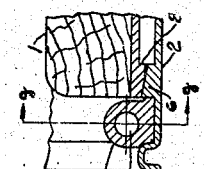
Figure 11:
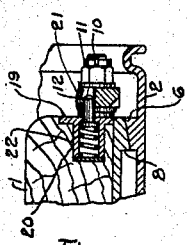
Figure 14:
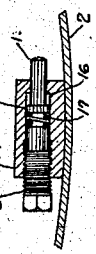
Figure 15:
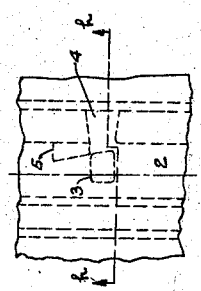
Figure 7:
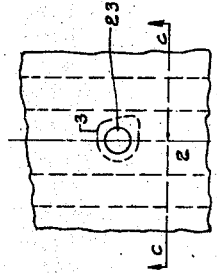
Figure 8:
Figure 9:
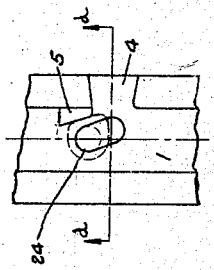
Figure 10:
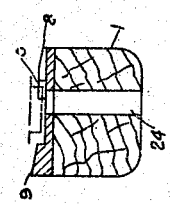

The preferred form of embodiment of my invention is illustrated in the accompanying drawings, of which Figure 1 is a side elevation of a felly rim containing my improved demountable tire rim. Fig. 2 is a section taken on the line $a$—$a$ of Fig. 1. Fig. 3 is a cross sectional view through the tire rim. Fig. 4 is a plan view thereof. Fig. 5 is a plan view of the felly rim, partly broken away, showing in dotted lines the position on the latter, of one of the tire rim locking-lugs after said tire rim has been turned to the right. Fig. 6 is a section on the line $b$—$b$ of Fig. 5. Fig. 7 is a plan view of that portion of the tire rim through which the valve stem extends. Fig. 8 is a section on the line $c$—$c$ of Fig. 7. Fig. 9 is a plan view of that portion of the felly rim through which the valve stem extends. Fig. 10 is a section taken on the line $d$—$d$ of Fig. 9. Fig. 11 is a section taken on the line $e$—$e$ of Fig. 1, showing the locking plunger for the tire rim locking lever. Fig. 12 is a side view of the latter. Fig. 13 is a section taken on the line $f$—$f$ of Fig. 1, showing the case that receives the adjusting screw. Fig. 14 is a longitudinal section on the line $g$—$g$ of Fig. 13, showing the plunger that is engaged by the front end of the locking lever. Fig. 15 is a plan view of the felly rim, showing the position of a locking lug thereon just before the tire rim is turned to the right. And Fig. 16 is a section on the line $h$—$h$ of Fig. 15.

Throughout the specifications and drawings, similar reference characters denote corresponding parts.

In a detailed description of the preferred form of embodiment of my invention, the numeral 1 designates the felly and 2 the tire rim of an automobile wheel. Provided on the inner periphery of the tire rim 2 are preferably four lugs 3 adapted to easily enter four respective inwardly tapering slots 4 arranged to receive them in the outer annular edge of the felly band of the felly 1. In other words, when the tire rim 2 is applied to the felly band of the felly 1, the former is brought to a position wherein its lugs 3 may enter the slots 4. It is then pushed inwardly on the felly band a sufficient distance to bring the lugs 3 to a position wherein they will slidingly engage four respective wedges 5 arranged as follows on the felly band of the felly 1.

Figure 16:
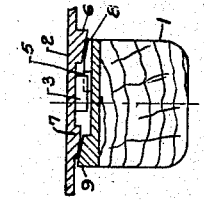

Referring to Figs. 5, 6, 15 and 16, it will be noted that each wedge 5 is provided on the felly band behind, and at one side of each slot 4, so that when the tire rim is turned to the right, each lug will start from a position shown in Figs. 15 and 16, and engage the tapering portion of its respective wedge 5, which will force the tire rim inwardly as it is turned circumferentially. The greater the distance the tire rim is turned to the right, the more firmly it will cling to the felly band of the felly 1 for the following reasons.

Referring to Figs. 8 and 16, there is formed on the inner periphery of the tire rim 2, one on each side of the lugs 3, two annular flanges 6 and 7 which are wedge shaped in cross section. These flanges 6 and 7 are adapted to mount flanges 8 and 9 respectively, formed on the outer periphery of the felly band, the taper of the latter flanges running in a direction opposite to that of the flanges 6 and 7, whereby, when the tire rim is forced inwardly by the wedges 5, the flanges 6 and 7 will tightly engage the flanges 8 and 9 to make a close fit between the tire rim and felly band.

From the above it will be observed that the greater the inward movement of the tire rim 2 is, the tighter it will cling to the felly band 1. In other words, as the tire rim is turned to the right, the more firmly will it wedge itself upon the felly band 1. To maintain it in its wedged position, the following construction is provided. Referring to Figs. 1, 12 and 14, there is pivotally secured to the side of the felly 1 by means of a bolt 10 and nut 11, a locking lever 12. The latter is adapted to be swung into the position shown in Figs. 1 and 12, to bring its lower end into engagement with a plunger 13. This plunger projects beyond a case 14 which is secured to the tire rim 2 as shown in Fig. 14, said plunger terminating at its inner end in an enlarged cylindrical portion 15 that is movable in a counterbore 16 provided in said case. The cylindrical portion 15 of said plunger rests upon a coil spring 17 which is adapted to be compressed by the former against the inner end of an adjusting screw 18 that is screwed into the lower threaded end of the counter bore 16. (See Fig. 14). When the tire rim 2 is in position upon the felly band it is turned to a position to engage the plunger 13 in the direction of its length, thereby resiliently maintaining the tire rim 2 in its wedged position on the felly band after having been forced to the right. The force with which it is held in such position may be varied by turning the adjusting screw 18 in the cylindrical counter bore 16.

In order to hold the locking lever 12 firmly in the position in which it is shown in Figs. 1 and 12, or its locking position, the following device is provided. Referring to Figs. 1, 11 and 12, there is preferably screwed to the felly 1, a socket 19 having a countersunk portion 20 extending well into the felly. In this countersunk portion 20 the lower end of a plunger 21 is movable against the pressure of a coil spring 22, the latter being adapted to force the outer end of said plunger across the path of circumferential movement of the locking lever 12, to prevent its rearward movement when in engagement with the plunger 13. By pressing inwardly upon the plunger 21, said locking lever 12 may be readily withdrawn from engagement with the outer end of the plunger 13 to permit the tire rim 2 to be taken off. After the lever 12 is withdrawn from engagement with the plunger 13, it is only necessary, to remove the tire rim, to turn it to the left a sufficient distance to permit the lugs 3 to be withdrawn from the slots 4 in the felly band, which operation dispenses with the laborious one of removing numerous nuts as in the case of the present demountable rims.

To apply the tire rim to the felly band, it is first necessary to force the valve stem 23 through a longitudinal slot 24 provided in the felly band of the felly 1, as shown in Figs. 9 and 19, whereupon said tire rim may be turned to the right as before explained, with the valve stem 23 free to travel through the slot 24 during said turning operation. It is unnecessary to turn any nuts to wedge the tire rim on the felly band, for, as the former is turned to the right, it is forced inwardly on the felly band of the felly 1 by the wedges 5, and the greater its inward movement, the more firmly it will cling to the felly by reason of the engagement between the flanges 6 and 7, and 8 and 9 heretofore described. To maintain the tire rim in its running position on the felly band, the locking lever 12 is then brought into engagement with the plunger 13, after which the plunger 21 is snapped across its path by the coil spring 22 to hold it in its locking position.

I do not wish to be limited to the details of construction and arrangement herein shown and described, and any changes or modifications may be made therein within the scope of the subjoined claims.

Having described my invention, I claim:

1. In a device of the type specified, the combination with a felly band provided with slots in its periphery, of a tire rim provided with projecting elements on its inner periphery adapted to enter said slots which terminate near the middle of the felly band, wedge shaped members on the felly band at the side of said slots, adapted to be engaged by said tire rim elements to force the tire inwardly as it is turned circumferentially, means on said tire rim and felly band adapted to wedge the former firmly on the latter as said tire rim is forced inwardly, a plunger on said tire rim, a felly to which said felly band is fixed, and a member pivotally secured to said felly, adapted to engage said plunger in the direction of its length, to hold said tire rim in its wedged position on said felly band.

2. In a device of the type specified, the combination with a felly band provided with slots in its periphery, of a tire rim provided with projecting elements on its inner periphery adapted to enter said slots which terminate near the middle of the felly band, wedge shaped members on the felly band at the side of said slots, adapted to be engaged by said tire rim elements to force the tire inwardly as it is turned circumferentially, means on said tire rim and felly band adapted to wedge the former on the latter as said tire rim is forced inwardly, a plunger on said tire rim, a felly to which said felly band is secured, a locking member pivotally secured to said felly, adapted to engage said plunger in the direction of its length, to hold said tire rim in its wedged position on said felly band, and means for adjusting the normal longitudinal position of said plunger.

3. In a device of the type specified, the combination with a felly band provided with slots in its periphery, of a tire rim provided with projecting elements on its inner periphery adapted to enter said slots which terminate near the middle of the felly band, wedge shaped members on the felly band at the side of said slots, adapted to be engaged by said tire rim elements to force the tire inwardly as it is turned circumferentially, means on said tire rim and felly band adapted to wedge the former on the latter as said tire rim is forced inwardly, a plunger on said tire rim, a felly to which said felly band is secured, a locking member pivotally secured to said felly, adapted to engage said plunger in the direction of its length, to hold said tire rim in its wedged position on said felly band, and a second plunger adapted to be projected across the path of rearward movement of the pivoted member, to maintain it in its locking position.

In testimony whereof I have hereunto set my hand this 24th day of August, 1918.

EDWARD C. HORNI.

Witness:
HOWARD S. SMITH.